United States Patent [19]
Murray, Jr.

[11] 3,947,187
[45] Mar. 30, 1976

[54] PHOTOGRAPHIC FILM DRIVE SYSTEM EMPLOYING INERTIA DUMPER

[75] Inventor: Joseph E. Murray, Jr., Malden, Mass.

[73] Assignee: Polaroid Corporation, Cambridge, Mass.

[22] Filed: May 15, 1974

[21] Appl. No.: 470,179

[52] U.S. Cl. .................. 352/72; 352/173; 242/205
[51] Int. Cl.² ............................................. G03B 1/40
[58] Field of Search............ 352/72, 78 R, 124, 166, 352/173, 174; 242/201, 202, 205, 208, 67.4; 226/121, 60

[56] References Cited
UNITED STATES PATENTS

| | | |
|---|---|---|
| 2,912,178 | 11/1959 | Schuyler.......................... 242/208 X |
| 3,514,197 | 5/1970 | Sho................................... 352/72 X |
| 3,643,469 | 2/1972 | Enomoto ........................... 242/205 |
| 3,719,335 | 3/1973 | Kurasawa....................... 352/124 X |

Primary Examiner—L. T. Hix
Assistant Examiner—Alan Mathews
Attorney, Agent, or Firm—David R. Thornton

[57] ABSTRACT

Photographic processing and projector apparatus having a drive system including a gear train for advancing and rewinding the film on spools within a film cassette. Included in the gear train is an inertia dumper which is operative at the conclusion of a high speed rewind run to reduce film tension and cassette shock caused by the abrupt cessation of film movement at the end of the film.

8 Claims, 8 Drawing Figures

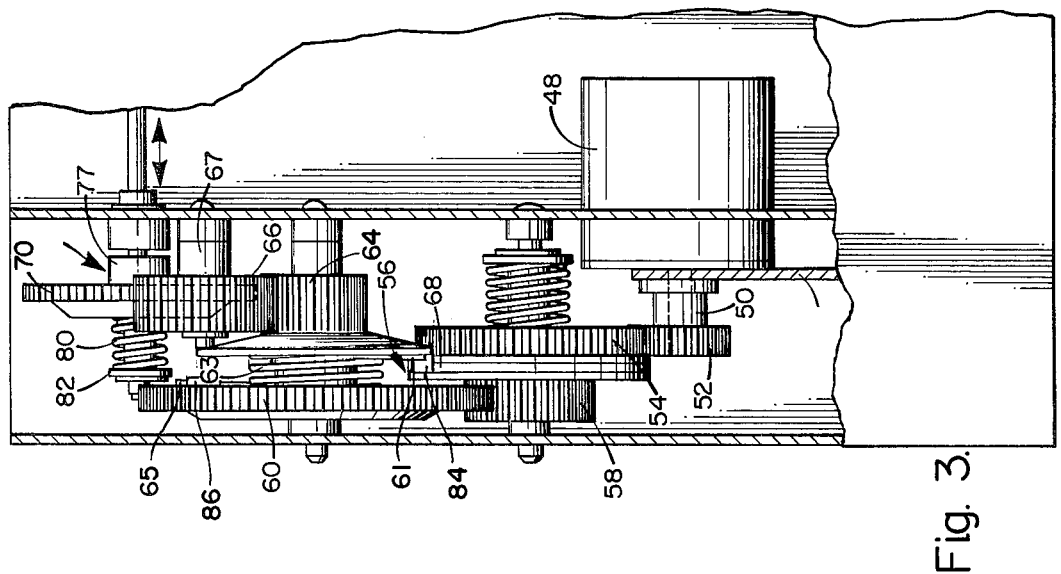
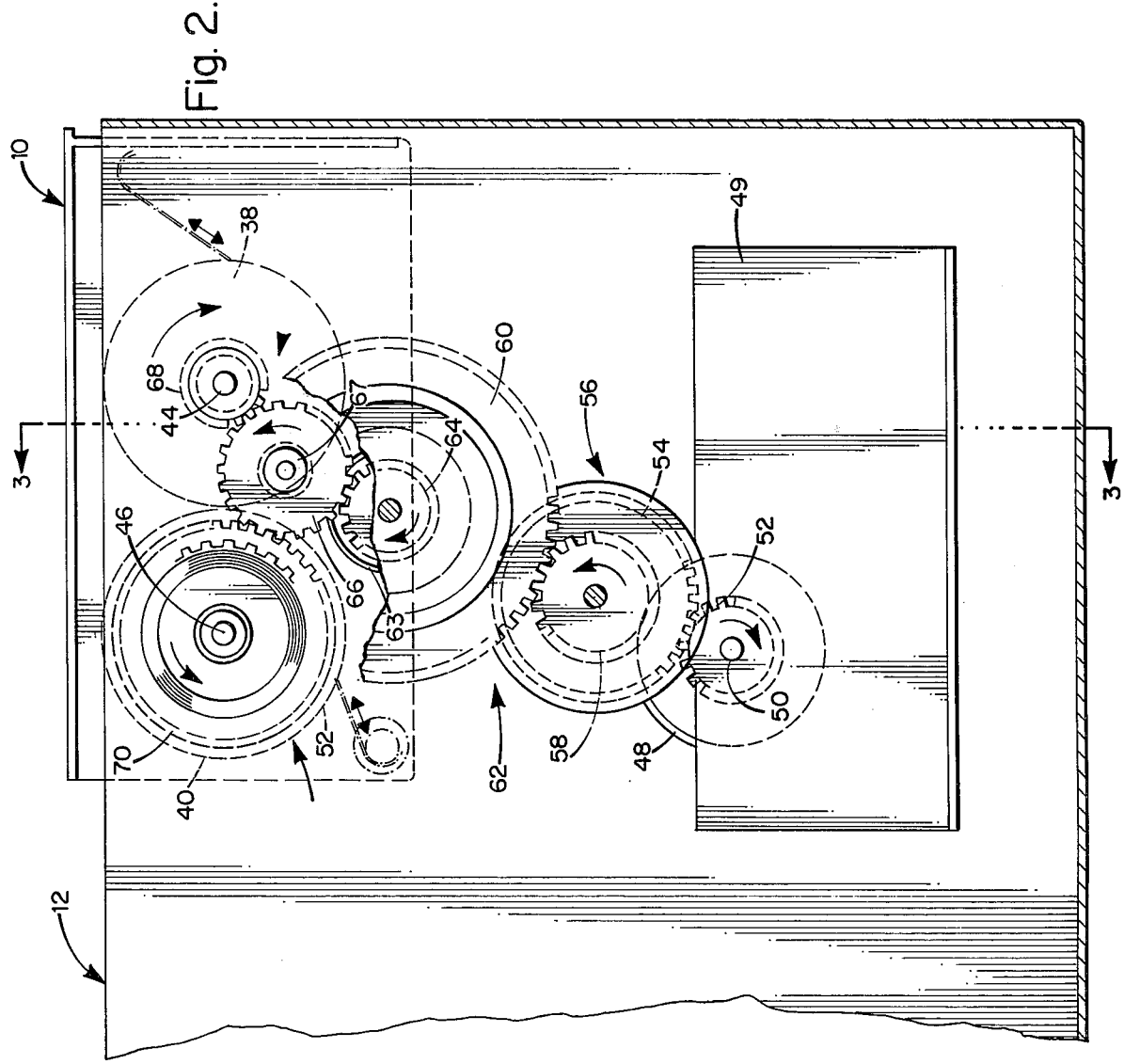

PHOTOGRAPHIC FILM DRIVE SYSTEM EMPLOYING INERTIA DUMPER

BACKGROUND OF THE INVENTION

1. Field of the Invention

This invention relates to photographic apparatus and, more particularly, to an improved drive system for advancing and rewinding film in a film cassette inserted into the photographic apparatus.

2. Prior Art

Recent important technological advances have made it possible to provide multi-purpose motion picture cassettes from which the film need not be removed during exposure, processing and projection operations. Exemplary of such systems are those described in U.S. Pat. No. 3,615,127 of Edwin H. Land issued Oct. 26, 1971; and U.S. Pat. No. 3,77,861 of Edwin H. Land issued Nov. 13, 1973.

Such systems utilize replaceable film cassettes, each containing a strip of film, a supply of processing composition for the film, and an internally programmed processor responsive to manipulation of the film in the cassette for applying the processing composition to the film after its exposure. Initially the cassette is inserted into a camera for exposure of the film. After exposure, it is loaded into a projector apparatus which is adapted to receive the cassette and has a drive apparatus for manipulating the film in the cassette. The film is manipulated in a sequence determined by a signal provided by the cassette that indicates whether or not the film has been processed.

When a cassette containing unprocessed film is inserted into the projector, movement of the film activates the processor, developing the film to produce a series of fixed, visible, projectable images as the film is driven by the drive system. Thereafter, the apparatus manipulates the film in an optical system, causing it to be projected for viewing. The film is then rewound from a takeup spool onto a supply spool for storage and subsequent reuse. The speed at which the film is rewound exceeds the speed at which the film is advanced during the projection mode. Finally, the cassette is automatically ejected. In response to insertion of a cassette containing processed film, the apparatus simply projects the film, rewinds it, and then ejects the cassette.

SUMMARY OF THE INVENTION

When the film in the cassette is driven from one spool to the other and the film reaches a given end, film advancement abruptly ceases. This stopping of film motion halts rotation of the film spool. In the rewind mode, where relatively continuous high speed motion of the film drive is employed, the system develops considerable kinetic energy such that the abrupt halting of the film produces a large peak force on the cassette elements, e.g., high film tension.

The present invention is designed to temporarily absorb this kinetic energy of the drive system so as to reduce the shock or peak forces applied to the cassette at the end of a high speed film run particularly when the film is rewound onto the supply spool.

Consequently, a primary object of this invention is to provide an improved film drive system for use in photographic apparatus.

Another object of this invention is to provide means for dampening high peak forces developed within a film drive system resulting from abrupt cessation of film movement.

Still another object of this invention is to provide a drive system which exerts minimum forces on a film cassette whose film strip is subject to abrupt cessation of advancement.

Broadly, the invention comprises a photographic film drive system having an energy absorbing means of significantly greater compliance than the film strip or the cassette elements associated with film advancement such that the kinetic energy of the drive system is essentially absorbed in the drive system when abrupt film stoppage occurs.

In the illustrated embodiment, the photographic apparatus has a novel film drive system including an inertia dumper consisting of a pair of drive elements or gears intercoupled through a torsion spring having a much lower spring rate than the film strip so that at the end of the high speed rewind of the film onto the supply spool at which time a film speed of approximately 90 inches per second is reached, the peak energy or shock generated upon cessation of film movement is absorbed by the spring which permits limited movement between the pair of drive elements against the bias of the spring. Thereafter, the spring returns the drive elements to their normal angular positions relative to each other.

When the film is being driven in the forward direction from the supply spool to the takeup spool, for example, during projection, there is a direct driving relationship between the two drive elements such that the drive elements are not operative on each other through the spring but are directly intercoupled through the provision of a lug or abutment on one of the drive elements in physical contact with an abutment on the other drive element. Since the forward movement of the film onto the takeup spool is intermittent and at considerably slower speed than the speed of the film while being rewound, the magnitude of the energy to be dissipated when the film is fully advanced onto the takeup spool does not present the same problem as when the film is rewound onto the supply spool.

Although not limited thereto, the film drive system finds particular utility in a projector which, as in the illustrated embodiment, is a rear projection viewer which includes a slot-like well configured to receive a film cassette. Responsive to insertion of the cassette within the well, a shaft member is displaced laterally into the cassette to cam the latter into, and lock it in an operative position within the apparatus. Displacement of the latching shaft into its latching position automatically brings cooperating elements of the apparatus into operative engagement with the cassette and initiates the start of a preprogrammed operational sequence. Finally, at the completion of the preprogrammed sequence, the latching shaft and other cassette engaging elements are automatically withdrawn, the cassette is partially ejected from the well so as to be accessible for manual removal by the operator and the apparatus is shut off.

The cassette includes means for indicating the processed or unprocessed condition of its film strip and the apparatus is configured to cooperate with and respond to this indicating means so as to operate the cassette in either a processing-projection sequence or only a projection sequence. This is accomplished by apparatus configured for automatically transporting the film strip in both a forward and rewind direction and for then terminating the cassette operation. When the film strip has been previously processed, the projection operation is carried out during this first forward run. However, if the film strip has not been previously processed, projection during the first forward transport is omitted and the film strip is processed during the immediate rewind. Then, the transport is automatically repeated with projection thereby allowing the film to be first processed and then projected. Consequently the apparatus is capable of automatically operating the cassette in either a processing-projection program or only a projection program and for terminating cassette operation subsequent to completion of either program.

Preferably, the apparatus is configured to cycle the cassette film so as to initially transport the film in a forward direction to the takeup spool and then rewind the entire length to the supply spool. Following rewind to the supply spool, the apparatus automatically disengages the latching shaft member and the driving elements, ejects the cassette and shuts off the apparatus. When the film strip is unprocessed, the apparatus automatically prevents projection during the first forward transport of the film and release of the shaft at the end of the first rewind (during which processing occurs) such that the cassette is then operated through an additional forward transport of the film for projection and a subsequent rewind at which time the termination of the program and ejection of the cassette occurs.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

FIG. 2 is a partial vertical cross sectional view taken on line 2—2 of FIG. 1 showing the film drive system of the present invention during rewind drive of the film;

FIG. 3 is a view taken on the line 3—3 of FIG. 2;

DETAILED DESCRIPTION OF THE INVENTION

Figure 1:
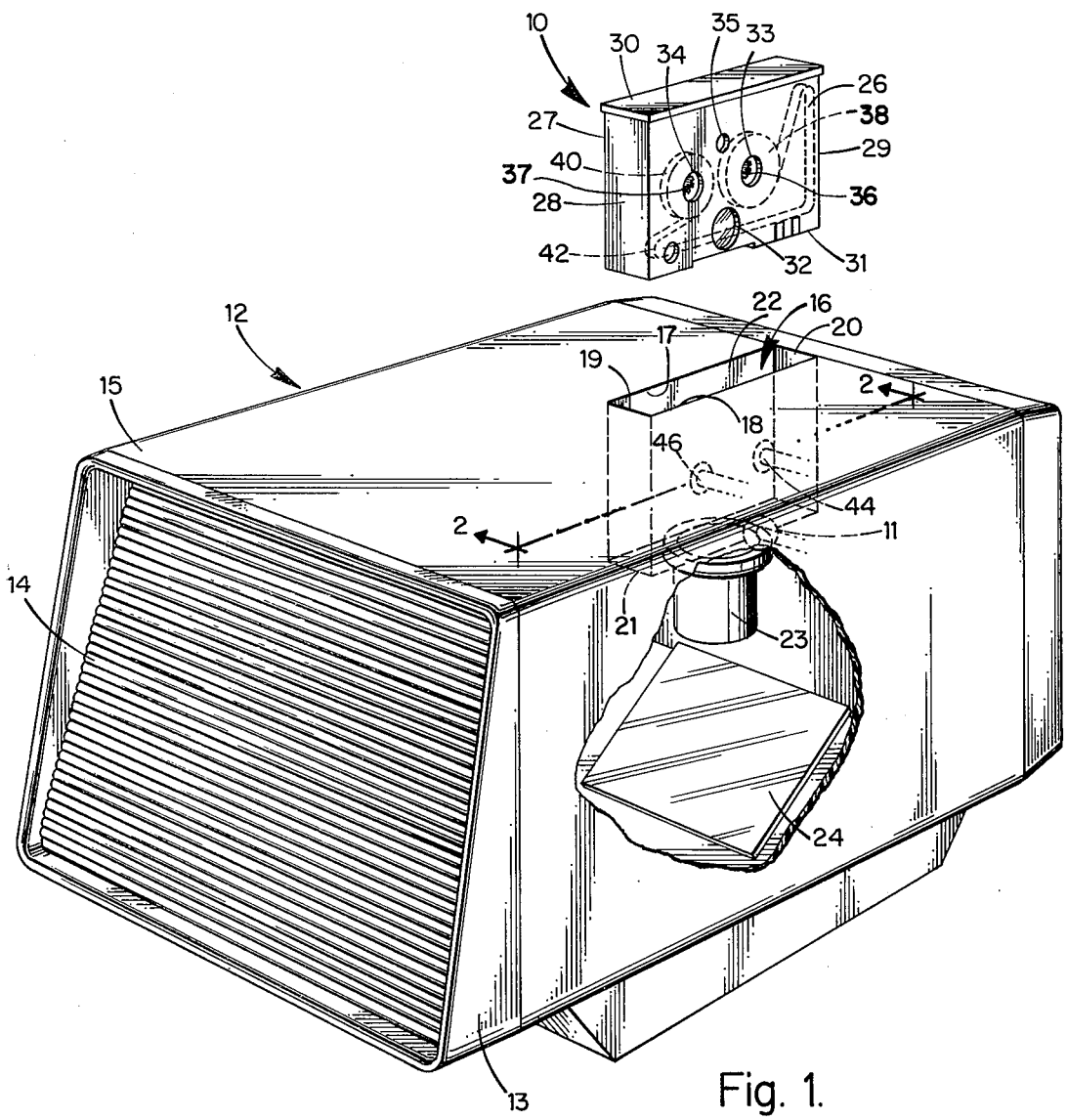
FIG. 1 is a diagrammatic perspective view of a motion picture film handing cassette and a motion picture projector apparatus embodying the features of this invention.

Referring now to the drawings and, more particularly, to FIG. 1, reference numeral 10 generally designates a film handling cassette which is employed in conjunction with a projector 12. The cassette is of the multi-purpose type which is designed to be first exposed in a camera to record scene images on the film. Then, the cassette is loaded into the projector which first subjects the film strip to a processing treatment, thereafter dries the film strip, and projects the recorded images for viewing. The cassette 10 and projector 12 are of the type described in U.S. Pat. No. 3,771,862 issued to Edwin H. Land on Nov. 13, 1973.

The projector 12 is illustrated as a rear projection viewer comprising a box-like housing 13 which includes a front viewing screen 14. In the top surface 15 of the housing there is a cassette-receiving slot or well 16 which extends to and is in communication with the top surface 15. In this embodiment, the well 16 is made up of side walls 17 and 18, end walls 19 and 20 and bottom wall 21 which together form a box-like, open ended slot 16 in communication with the top surface 15 through the open top 22 of the well. Mounted beneath the cassette-receiving well 16 is projection lens assembly 23 and a reflector element 24 which in conjunction with a conventional projection lamp 11 is configured to project film images forwardly to the rear of the transparent screen 14.

As shown in FIG. 1, the cassette 10 is oriented over the cassette-receiving well 16 in proper position for loading within the receiving well. Loading is accomplished by moving the cassette downwardly to slide it within the receiving well 16.

The cassette 10 comprises a generally parallelepiped casing or housing 25 constituted by a pair of planar side walls 26 and 27 joined together at their edges by end walls 28, 29 and elongated top and bottom edge walls 30 and 31. A plurality of apertures are located in side wall 26 to facilitate the cassette operation. Hence, an illumination aperture 32 is configured to permit entrance of illumination for projection purposes. Apertures 33 and 34 permit access of external drive members, and aperture 35 is configured to receive a latching shaft of the apparatus for locating and locking the cassette within the well 16, as will be more fully explained hereinafter. Within cassette 10, a pair of spools 38 and 40 having hubs 36 and 37 respectively located in alignment with apertures 33 and 34 are mounted for rotation about parallel axes. The spool 38 provides a supply spool to which a trailing end (not shown) of a film strip 42 is attached and about which substantially the entire length of the film strip 42 is initially coiled (prior to exposure) with a leading end (not shown) of the film extending across an exposure projection station, designated at 39 and affixed to the spool 40 which provides a takeup spool.

When the cassette is inserted into the projector, a latching shaft (not shown) of the apparatus is inserted into aperture 35 of the cassette and actuates extension of a pair of drive spindles 44 and 46 into operative engagement within apertures 33 and 34 in the cassette side wall 26. Hence, the spindles 44 and 46 provide means for coupling the projector drive to the cassette film spools.

Figure 4:
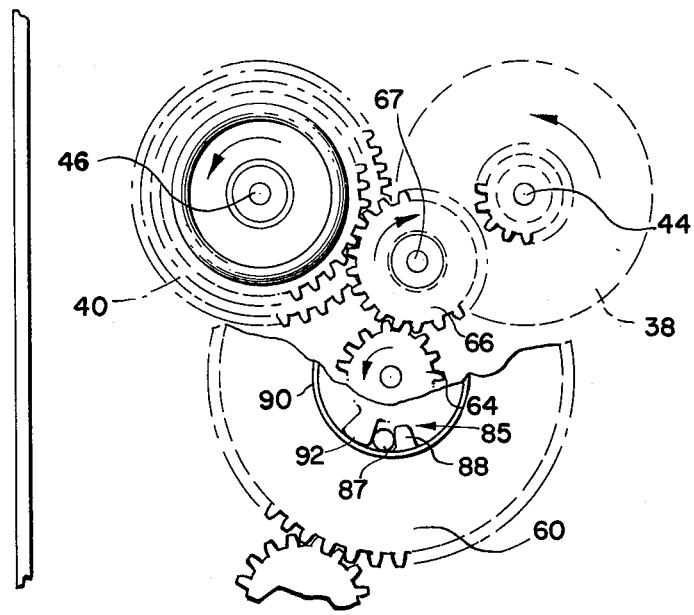
FIG. 4 is a fragmentary view of a portion of the gear train of FIG. 2 as positioned during forward drive of the film.

Referring now to FIG. 2 which shows the cassette 10 in operative position within the projector, the drive system for spindles 44 and 46 will now be described. The film drive system includes an actuatable power drive means, such as a reversible DC motor 48 to provide torque for driving the supply spool drive spindle 44 and the takeup spool drive spindle 46. Motor 48 is supported within the projector housing upon a frame member 49. A pinion gear 52 is keyed to the motor output shaft 50 and is in engagement with a spur gear 54. Spur gear 54 is coupled through a relatively high torque slip clutch 56 to a pinion gear 58. Pinion gear 58 in turn is in engagement with a spur gear 60 which is part of the inertia dumper generally designated by reference numeral 62. The inertia dumper 62 provides means for resiliently coupling the drive motor to the spool coupling spindles at least in one direction of drive rotation and comprises another drive element consisting of pinion gear 64 which is coaxial with the spur gear 60 and a resilient means, such as a torsion spring 63, between the gears 60 and 64. The interrelationship between gears 60 and 62 and spring 63 will be described hereinafter in connection with the description of FIG. 5. The inertia dumper pinion gear 64 meshes with a spur gear 66 which is positioned upon a movable support shaft 67 which permits the gear 66 to be either in engagement with gear 68 on supply spool drive spindle 44 when the spur gear 66 is driven in a counterclockwise direction as illustrated in FIG. 2, or in engagement with gear 70 mounted on the takeup spool drive spindle 46 when gear 66 is rotating clockwise as shown in FIG. 4. That is, because of the drag between gear 66 and its shaft 67, reversal of motor 48 and hence gear 64 displaces the gear 66 left or right between the positions shown in FIGS. 2 and 4.

Figure 5:
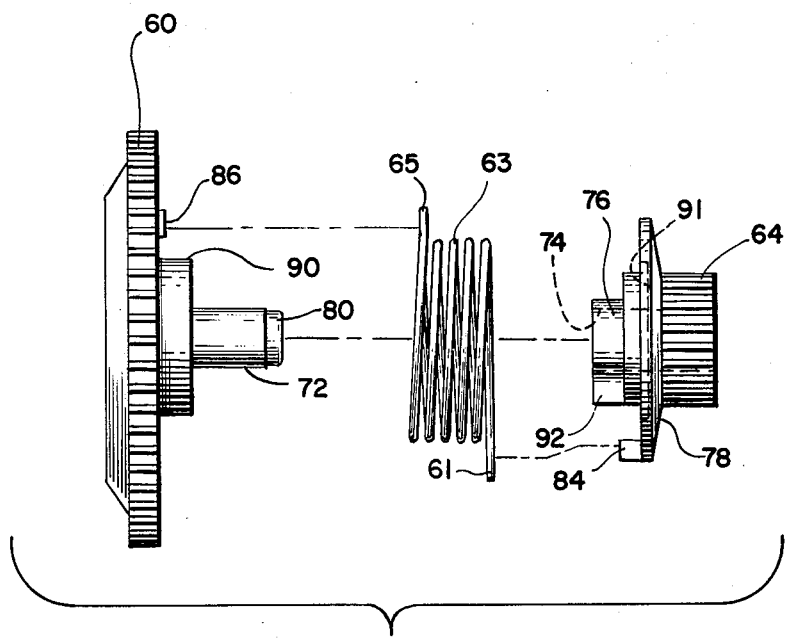
FIG. 5 is an exploded view of the elements forming the inertia dumper of the present invention.

Referring to FIG. 5, as stated previously, the inertia dumper 62 is comprised of a pair of gears 60 and 64 which are intercoupled by a torsion spring 63. The gear 60 has at its center an outwardly projecting hollow axle 72 which extends into an axial bore 74 which commences in a tubular projection 76 on gear 64. The bore 74 continues through flange-like central portion 78 and through gear 64. When the gear elements are assembled, the axle 72 extends completely through bore 74, and the end 80 of axle 72 is engaged by a snap fastener 82 to maintain the parts in assembled relationship. As shown in FIG. 2, one end 61 of torsion spring 63 is attached behind an abutment 84 on the outer periphery of the central flange portion 78 of gear 64 whereas the other end 65 of spring 63 is held against the side of an abutment 86 on the gear 60. The spring 63 is loosely centrally retained in the assembled position by a tubular housing or sleeve 90, disposed on gear 60 concentrically with the axle 72 and is wound on a diameter sufficiently larger than the diameter of the sleeve 90 so that the spring does not coil tightly against the latter during dumper operation.

When assembled, the tubular sleeve 90 fits within a circular groove 91 of the flange 78 and spaces the gear 64 from the gear 60 such that abutments 84 and 88 are longitudinally spaced from each other so as to clear or pass over each other.

To provide a substantially direct drive in one direction, e.g., when gear 64 is driven in a ccw direction, the gear 64 includes a projecting rib 92 shown in FIG. 4 which is configured to engage a drive transmitting member or stop 85 comprised of a hard rubber abutment or block 87 adjacent a strengthening projection 88 within the tubular housing 90 of gear 60. The stop 85 is positioned nearly 180° from the operating surface 86 of the spring abutment 86 whereas the rib 92 of gear 64 is adjacent the abutment 84. Further, the spring 63 in the relaxed condition has its ends spaced nearly 180° apart.

During assembly of the dumper, the gear 64 is rotated clockwise (cw) as viewed in FIG. 4 against the spring 63 while rib 92 is dropped into the tubular housing 90 clockwise of the stop 85. Hence, the spring 63 then forces the rib 92 against the block 87 and provides a substantially direct drive relation between gears 60 and 64 when the gear 64 is rotating counterclockwise, or, that is, in the forward advancement mode. As shown in FIG. 4 when the film is being advanced in a forward direction from the supply spool 38 onto the takeup spool 40, the inertia dumper is rotating counterclockwise and there is direct drive between gears 60 and 64 at this time.

On the other hand, when these gears are driven to rotate clockwise, there is initially limited angular movement between gears 60 and 64 against the bias of spring 63, and in this case, the gears are intercoupled through the torsion spring 63. Hence, referring again to FIG. 2, when the film is being advanced in a rewind direction from the takeup spool 40 onto the supply spool 38, the inertia dumper is rotating clockwise and there is a resilient, spring coupled drive between gears 60 and 64.

It should be noted that the clutch 56 is designed to slip once the film has stopped and this load has been transmitted back through the drive to the clutch. Hence, the clutch has a given breakaway torque substantially higher than the running load of the film. Once the clutch beings to slip as later explained with regard to FIG. 8, the film tension can only reach a level commensurate with the breakaway torque; however, since the latter is not instantaneous with film stoppage, the clutch and the motor probably contribute to the kinetic energy which must be absorbed in the drive system at the instant the film end is reached.

For switching the drive system from engagement with the spindle drives of the two film spools, motion detectors (not shown) may be employed to sense when rotation of the moving spool spindle ceases and to subsequently reverse the input to DC motor 48. Thus, for example, when the forward movement of the film from the supply spool has been completed using the direct drive in the inertia dumper and with the gears in the FIG. 4 relationship, cessation of the spool spindle rotation is sensed and causes reversal of the DC motor 48. Since the forward film motion is at relatively low speed, the cessation of forward movement normally does not cause shocks or energy peaks which cannot be absorbed by the cassette and its film strip 42 without harm.

The reversal of the motor 48 results in a consequent reversal of the direction of rotation of the spur gear 60 to the clockwise direction. This tends to move the projection 92 of gear 64 away from the stop 85 of the gear 60 and against the spring 63. This rotation thereby increases the contraction or load on spring 63, and the driving engagement between the two gears 60 and 64 is only through the spring. As later explained in detail with regard to FIGS. 6 and 7, this driving engagement through the spring provides an elasticity in the drive which while sufficient to provide tight coupling for the load expected during the film running is much less than the film and film cassette compliance so as to permit displacement between the drive elements and absorption of the kinetic energy of the system when the film abruptly stops the drive.

Clockwise rotation of gear 64 causes gear 66 to move from its FIG. 4 position in engagement with gear 70 to its FIG. 2 position in which it meshes with the small gear 68 associated with the supply spool. Since gear 88 is smaller than gear 66, the film is rewound onto the supply spool 38 at high speed. At the completion of the high speed rewind operation when the leading end of the film is reached and the film stops, rotation of the supply spool 38 and its associated drive spindle 44 stops abruptly. This tends to cause a sharp energy peak or shock to the cassette elements such as the film spool 38 and the film strip 42. This energy peak or shock is dampened and/or dissipated by permitting angular rotation between gears 60 and 64 of inertia dumper by further contraction of the torsion spring 63 as the motor continues to run in this direction. The energy stored in spring 63 is thereafter effective to turn gears 60 and 64 to their relative positions during the direct drive phase, i.e., to positions in which block 87 and rib 92 are in contact.

As previously indicated, the spring 63 is preloaded during assembly so as to hold the two gears in driving engagement with each other. While this preload need not exceed the expected running load of the film during rewind, in the preferred embodiment the preload is made slightly greater than the running load. For example, in the preferred embodiment where a running load of approximately 15 ounces is anticipated, the spring preload is in the order of 20 ounces. Hence, except for start up inertia of the rewind or for temporary variations causing increased load, the gear 64 is held ccw against the stop 85 of the gear 60 by the spring 63 until film stoppage occurs at which time the gear 64 rotates cw while the gear 60 remains stationary.

Figure 8:
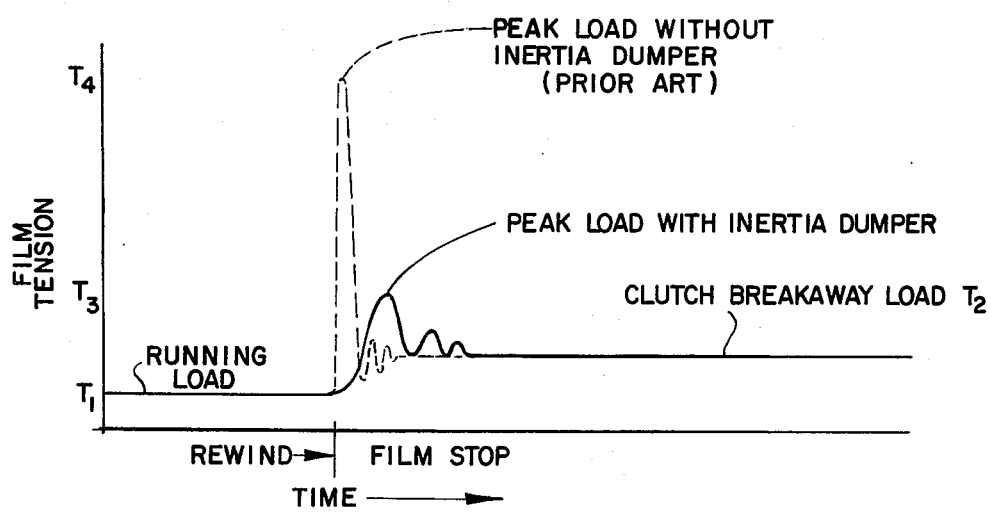
FIG. 8 is a graph depicting the film tension vs. time during the completion of rewind.

The operation of the inertia dumper will now be explained by referring to FIG. 8 wherein the film tension during rewind is plotted under conditions with and without the novel dumper arrangement. As can be seen from this figure, the film during rewind experiences a running load tension of $T_1$. At the end of rewind, when the film stops, the tension rises rapidly on the film to $T_4$ if the dumper is not present but only rises to $T_3$ when the inertia dumper is employed. The peak force then rapidly diminishes until the film is subjected to the tension $T_2$ resulting from the breakaway torque setting of the system clutch.

The peak film tension results from the fact that at the end of rewind there is a significant amount of rotational kinetic energy stored in the drive system. This energy must be absorbed at the end of the run when the film and drive system stops. Without the novel inertia dumper, the energy is essentially stored in the film since the latter has more elasticity or a lower spring rate than the drive components or cassette elements associated with film advancement. With regard to the latter, it should be noted that the supply spool and the idler components of the cassette may be slightly deformed and hence store some of the energy.

Figures 6, 7:
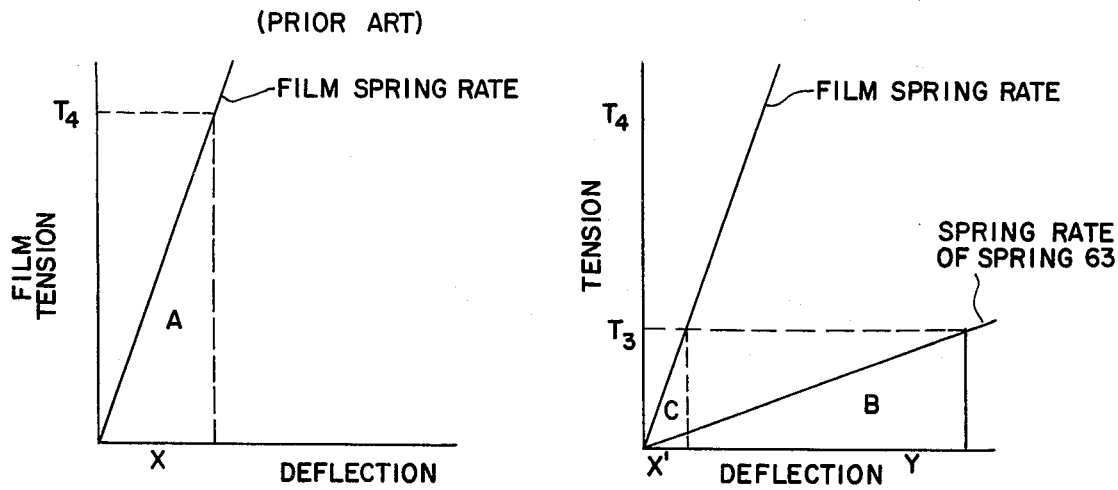
FIG. 6 is a graph depicting the film tension occurring at the end of rewind without the novel inertia dumper of the invention.
FIG. 7 is a graph showing the film tension experienced at the end of rewind when the inertia dumper is utilized.

Under these conditions, where the film is most compliant element, the film is stretched an amount "X" as shown in FIG. 6. The film stretches along its spring rate curve (which for clarity is assumed to be a straight line) as the tension rises to $T_4$ and the area, designated at A, under the curve represents the energy now stored in the film.

When the inertia dumper is inserted in the system, it, in effect, provides a low spring rate element between the film and the kinetic energy. Hence, the spring of the inertia dumper is in series with the film and has a much lower spring rate (e.g., approximately 1/50 that of the film when gearing is taken into effect as explained below) so that most of the kinetic energy is stored in the inertia dumper as represented by the area designated as B in FIG. 7. A small portion of the energy, represented by the area designated at C in this figure, is still stored in the film, but the overall tension experienced by the cassette and the film is limited to value $T_2$.

In the illustrated embodiment where the film speed at the end of rewind is expected to reach approximately 90 inches per second, and the film and supply spool spring rate was approximately 18 inch pounds per radian, the inertia dumper spring 63 was chosen to have a spring rate of approximately 0.4 inch pounds per radian. Since the gear ratio of the drive between the inertia spring 63 and the spool is 1.3 to 1, the film (and spool) spring rate appeared to be $18 \times 1.3$ or 23 such that the ratio of spring rates was 23/.4 which equals 58.

In the illustrated embodiment the dumper gears 60 and 64 can only rotate relative to each other approximately one turn before the stop 85 is reached. Hence, the spring rate of the spring 63 was also chosen so that the energy is absorbed with a one turn deflection, e.g., within approximately three-fourths of a turn. This follows since too low a spring rate would still allow a system shock as the stop is reached, or, that is, require the film to absorb the remaining energy. Consequently, in other embodiments where more than one turn of the dumper elements is permitted still lower spring rates will be useful.

It should also be noted that the inertia dumper must be placed between the drive system inertia, or, that is, between the elements in which the kinetic energy is stored and the film so that the dumper prevents this energy from reaching the film. Hence, in a preferred arrangement, the inertia dumper is as close to or actually also provides means for coupling to the film cassette or the film itself.

In some applications, the members providing a direct drive between the gears 60 and 64 may be omitted. In this case these gears would be intercoupled through the torsion spring regardless of the direction of rotation. In such an arrangement, the spring abutment members on the gears could be modified, e.g., to receive the ends of the spring in recesses so as to affix the spring ends to the gears.

While the invention has been described with particularity with respect to the details of a specific embodiment thereof, the invention is applicable to other types of photographic apparatus utilizing drive systems for the film. It should be understood that this invention may be practiced or embodied in other ways without departing from the spirit or essential character thereof. Hence, the preferred embodiment described herein is illustrative and not restrictive, the scope of the invention being indicated by the appended claims and all variations which come within the meaning of the claims are intended to be embraced therein.

What is claimed is:

1. Photographic apparatus for use with a film handling cassette, the cassette including a cassette housing retaining a photographic film strip and means for guiding the film strip along a given path within the housing, said guiding means including at least one film spool to which one end of the film strip is attached and upon which the film strip is wound, the film strip being drawn from the film spool as the film strip is advanced in a given direction within said cassette housing, the film strip being subject to abrupt stoppage within the cassette housing when the film strip is advanced to the one end, and the film strip and the film guiding means having a high spring rate, said apparatus comprising means for receiving the cassette, means for cooperating with the cassette when it is received in said receiving means for driving the film strip in at least said given direction along the given path within the cassette housing, said film driving means including means for absorbing at least a large portion of the kinetic energy of said driving means when film stoppage occurs, said absorbing means comprising means having a substantially lower spring rate than that of the film strip and the film guiding means when the film strip is driven by said driving means in said given direction, said driving means including a drive train having a plurality of elements configured for rotation, said absorbing means including a spring configured for intercoupling a first and a second of said plurality of elements, said spring having a lower spring rate than the spring rate of the film strip, said first and second elements engaging respective ends of said spring so as to provide a driving connection through said spring when said drive train is rotated in a first direction configured for advancing the film strip in said given direction, and said first and second elements include means for engaging each other so as to provide a direct driving connection when said drive train is rotated in the opposite direction.

2. The apparatus of claim 1 wherein said absorbing means is a spring having a spring rate approximately 1/50 the spring rate of the film strip.

3. The apparatus of claim 1 wherein said first and second elements comprise first and second gears mounted on a common axis, one of said gears having means for axially spacing the other of said gears therefrom, and said engaging means comprises an abutment member carried on each of said gears, said abutment members being positioned on each of said gears so as to contact each other when one of said gears is rotated in said opposite direction.

4. The apparatus of claim 1 wherein said first and second elements comprise first and second gears mounted on a common axis, each of said gears having a flange-like body portion extending radially from said common axis, one of said gears having a tubular sleeve projecting axially therefrom and configured for engaging the body portion of the other of said gears so as to axially space said body portions from each other, said spring being a tortion spring loosely coiled about said sleeve, and said engaging means includes an abutment member carried on each of said gears, said abutment members being respectively positioned on each of said gears so as to be located within said sleeve and to contact each other when at least one of said gears is rotated in said opposite direction.

5. The apparatus of claim 1 wherein said first and second elements comprise first and second gears mounted for rotation about a common axis, each of said gears having a flange-like body portion, one of said gears having a tubular sleeve projecting axially therefrom and configured for engaging the body portion of said second gear so as to axially space said body portions of each of said gears from each other, said second gear having an axial bore therein, and said first gear further including an axle located within said sleeve and concentric thereto, said axle projecting from said body portion beyond the distal end of said sleeve and within said axial bore of said second gear such that said second gear is mounted for rotation on said first gear, said spring being loosely coiled about said sleeve with the ends of said spring in engagement with each of said gears respectively, and said engaging means includes an abutment member carried on each of said gears, said abutment members being respectively positioned on said body portions of said gears so as to be located within said sleeve and to contact each other when at least one of said gears is rotated in said opposite direction.

6. The apparatus of claim 5 wherein said axle extends through said second gear, and further including means coupled to the distal end of said axle for retaining said second gear in a rotational arrangement thereon.

7. Photographic apparatus for use with a cassette having a cassette housing, a pair of film spools rotatably supported within the cassette housing, and a strip of photographic film having a given spring rate wound on and extending between the film spools with the respective ends of the film strip affixed to the film spools, the film strip being configured for advancement within the cassette by winding the film strip on one film spool as it is unwound from the other film spool and subject to abrupt stoppage of advancement as the film strip reaches the film strip end affixed to the said other film spool, said apparatus comprising drive means for rotating said film spools, said drive means including first and second gears rotatable about a common axis, and a spring of substantially lower spring rate than such film strip disposed between said first and second gears, said spring having portions thereof engaging portions of said first and second gears to permit limited angular movement between said first and second gears and to establish a driving connection therebetween in at least one direction of rotation thereof, said spring having a substantially lower spring rate than the given spring rate of such film so that said spring absorbs the kinetic energy of said drive means when such film movement abruptly ceases as a result of film stoppage, and each of said first and second gears having an abutment member thereon, said abutment members being positioned to contact each other when said first and second gears are rotated in a second direction opposite to said one direction to thereby establish a direct drive transmitting connection between said gears during rotation in said second direction.

8. The apparatus of claim 7 further comprising a tubular housing mounted on said first gear and disposed around said common axis, said tubular housing projecting from said first gear toward said second gear, and said abutment members being located on said gears so as to be positioned within said tubular housing.

* * * * *